(12) United States Patent
Yu et al.

(10) Patent No.: US 12,544,461 B2
(45) Date of Patent: Feb. 10, 2026

(54) ISOLATED NUCLEIC ACID MOLECULE AND APPLICATION THEREOF

(71) Applicant: GRITGEN THERAPEUTICS LIMITED, Suzhou (CN)

(72) Inventors: Tenghui Yu, Beijing (CN); Yang Li, Beijing (CN); Zhou Yang, Beijing (CN); Jianghong Zhang, Beijing (CN); Yuan Liu, Beijing (CN); Enxing Zhou, Beijing (CN); Xihuimin Dai, Beijing (CN); Yi Rao, Beijing (CN)

(73) Assignee: GRITGEN THERAPEUTICS LIMITED, Suzhou (CN)

( * ) Notice: Subject to any disclaimer, the term of this patent is extended or adjusted under 35 U.S.C. 154(b) by 843 days.

(21) Appl. No.: 17/788,713

(22) PCT Filed: Dec. 22, 2020

(86) PCT No.: PCT/CN2020/138395
§ 371 (c)(1),
(2) Date: Jun. 23, 2022

(87) PCT Pub. No.: WO2021/129624
PCT Pub. Date: Jul. 1, 2021

(65) Prior Publication Data
US 2023/0310655 A1 Oct. 5, 2023

(30) Foreign Application Priority Data

Dec. 23, 2019 (CN) .......................... 201911342624.0

(51) Int. Cl.
*C12N 15/85* (2006.01)
*A61K 48/00* (2006.01)
*C12N 9/02* (2006.01)
*C12N 15/86* (2006.01)

(52) U.S. Cl.
CPC ........ *A61K 48/0058* (2013.01); *C12N 9/0069* (2013.01); *C12N 15/86* (2013.01); *C12Y 113/12007* (2013.01); *C12N 2750/14143* (2013.01); *C12N 2830/008* (2013.01)

(58) Field of Classification Search
CPC ........ C12N 15/00; C12N 15/85; C12N 15/86; C12N 15/8645; A61K 48/00; A61K 48/0058
See application file for complete search history.

(56) References Cited

U.S. PATENT DOCUMENTS

| | | | |
|---|---|---|---|
| 10,308,705 B2 | 6/2019 | Xiao et al. | |
| 12,104,175 B2* | 10/2024 | Ramamoorthi | C12N 7/00 |
| 2018/0344877 A1 | 12/2018 | Doering et al. | |
| 2019/0241908 A1 | 8/2019 | Genkin et al. | |
| 2019/0309048 A1 | 10/2019 | Xiao et al. | |
| 2020/0216843 A1 | 7/2020 | Shen et al. | |
| 2020/0332293 A1* | 10/2020 | Thess | C12N 15/113 |

FOREIGN PATENT DOCUMENTS

| | | |
|---|---|---|
| CN | 1670216 A | 9/2005 |
| CN | 107531774 A | 1/2018 |
| CN | 108093639 A | 5/2018 |
| CN | 110229849 A | 9/2019 |
| WO | WO 2017/165862 A1 | 9/2017 |
| WO | WO 2019/143272 A1 | 7/2019 |

OTHER PUBLICATIONS

GenBank X01173, Xenopus laevis vitellogenin A1 5' flanking region, 1987.*
Schorpp et al, Hepatocyte-specific promoter element HP1 of the Xenopus albumin gene interacts with transcriptional factors of mammalian hepatocytes, J. Mol. Biol. 202(2):307-320, 1988.*
www.calculator.net/exponent-calculator; last visited Apr. 21, 2025.*
International Search Report issued Mar. 29, 2021, in PCT/CN2020/138395, 5 pages.
Strausberg, R.L. et al. "Accession No. BC011991: Homo sapiens Serpin Peptidase Inhibitor, Clade A (Alpha-1 Antiproteinase, Antitrypsin), Member 1, mRNA (cDNA Clone MGC: 9222 Image: 3859644), Complete Cds" GenBank Database, Jul. 15, 2006, 2 pages.

* cited by examiner

*Primary Examiner* — Kevin K Hill
(74) *Attorney, Agent, or Firm* — Merchant & Gould P.C.; Daniel J. Pereira (57) ABSTRACT

A liver-specific expressional regulatory element, including, in order from 51 to 31: a promoter of a dog serpinAl gene or a functional fragment thereof, a promoter of a *Xenopus laevis* vitellogenin A2 gene or a functional fragment thereof, a promoter of a *Xenopus laevis* albumin gene or a functional fragment thereof, and a promoter of a human serpinAl gene or a functional fragment thereof.

17 Claims, 3 Drawing Sheets
Specification includes a Sequence Listing.

```
                         SEQUENCE LISTING

<160> NUMBER OF SEQ ID NOS: 16

<210> SEQ ID NO 1
<211> LENGTH: 23
<212> TYPE: DNA
<213> ORGANISM: Artificial Sequence
<220> FEATURE:
<223> OTHER INFORMATION: synthetic DNA enhancer

<400> SEQUENCE: 1
cctaaaatgg gcaaacattg caa                                              23

<210> SEQ ID NO 2
<211> LENGTH: 158
<212> TYPE: DNA
<213> ORGANISM: Artificial Sequence
<220> FEATURE:
<223> OTHER INFORMATION: synthetic DNA the dog serpinA1 promoter
      fragment

<400> SEQUENCE: 2
gctgtttact gagctgggca caatgacctt tgcgagctg gacagagggc cgggcgcaga       60
cgggcaggcg ggtgggcagc tcggcgctga cctttgccct tagtccctgt ttgctcctcc     120
gataaccggg gtgaccttgg ttaatcatta accagcaa                            158

<210> SEQ ID NO 3
<211> LENGTH: 36
<212> TYPE: DNA
<213> ORGANISM: Artificial Sequence
<220> FEATURE:
<223> OTHER INFORMATION: synthetic DNA the xenopus laevis vitellogenin
      A2 promoter fragment

<400> SEQUENCE: 3
tggtgaggta attgtttaca caacctgata acagta                               36

<210> SEQ ID NO 4
<211> LENGTH: 65
<212> TYPE: DNA
<213> ORGANISM: Artificial Sequence
<220> FEATURE:
<223> OTHER INFORMATION: synthetic DNA the xenopus laevis albumin
      promoter fragment

<400> SEQUENCE: 4
ggttaataat tttccagatc tctctgagca atagtataaa acaagaggta tcactcattt      60
cagat                                                                 65
```

<210> SEQ ID NO 5
<211> LENGTH: 32
<212> TYPE: DNA
<213> ORGANISM: Artificial Sequence
<220> FEATURE:
<223> OTHER INFORMATION: synthetic DNA the human serpinA1 promoter
      fragment

<400> SEQUENCE: 5
caggcaccac cactgacctg ggacagtgaa tc                                      32

<210> SEQ ID NO 6
<211> LENGTH: 69
<212> TYPE: DNA
<213> ORGANISM: Artificial Sequence
<220> FEATURE:
<223> OTHER INFORMATION: synthetic DNA SV40 intron

<400> SEQUENCE: 6 ataaaattt taagtgtata atgtgttaaa ctactgattc taattgtttc tctcttttag         60
attccaacc                                                               69

<210> SEQ ID NO 7
<211> LENGTH: 5
<212> TYPE: DNA
<213> ORGANISM: Artificial Sequence
<220> FEATURE:
<223> OTHER INFORMATION: synthetic DNA Kozac sequence

<400> SEQUENCE: 7 ccacc                                                                    5

<210> SEQ ID NO 8
<211> LENGTH: 1653
<212> TYPE: DNA
<213> ORGANISM: Artificial Sequence
<220> FEATURE:
<223> OTHER INFORMATION: synthetic DNA a firefly luciferase gene

<400> SEQUENCE: 8
atggaagacg ccaaaaacat taagaagggc ccagcgccat tctacccact cgaagacggg        60
accgccggcg agcagctgca caaagccatg aagcgctacg ccctggtgcc cggcaccatc       120
gcctttaccg acgcacatat cgaggtggac attacctacg ccgagtactt cgagatgagc       180
gttcggctgg cagaagctat gaagcgctat gggctgaata caaaccatcg gatcgtggtg       240
tgcagcgaga atagcttgca gttcttcatg cccgtgttgg gtgccctgtt catcggtgtg       300
gctgtggccc cagctaacga catctacaac gagcgcgagc tgctgaacag catgggcatc       360
agccagccca ccgtcgtatt cgtgagcaag aaagggctgc aaaagatcct caacgtgcaa       420
aagaagctac cgatcataca aaagatcatc atcatggata gcaagaccga ctaccagggc       480
ttccaaagca tgtacacctt cgtgacttcc catttgccac ccggcttcaa cgagtacgac       540
ttcgtgcccg agagcttcga ccgggacaaa accatcgccc tgatcatgaa cagtagtggc       600
agtaccggat tgcccaaggg cgtagcccta ccgcaccgca ccgcttgtgt ccgattcagt       660
catgcccgcg accccatctt cggcaaccag atcatccccg acaccgctat cctcagcgtg       720
gtgccatttc accacggctt cggcatgttc accacgctgg gctacttgat ctgcggcttt       780
cgggtcgtgc tcatgtaccg cttcgaggag gagctattct tgcgcagctt gcaagactat       840
aagattcaat ctgccctgct ggtgcccaca ctatttagct tcttcgctaa gagcactctc       900

```
atcgacaagt acgacctaag caacttgcac gagatcgcca gcggcggggc gccgctcagc    960
aaggaggtag gtgaggccgt ggccaaacgc ttccacctac caggcatccg ccagggctac   1020
ggcctgacag aaacaaccag cgccattctg atcacccccg aaggggacga caagcctggc   1080
gcagtaggca aggtggtgcc cttcttcgag gctaaggtgg tggacttgga caccggtaag   1140
acactgggtg tgaaccagcg cggcgagctg tgcgtccgtg gccccatgat catgagcggc   1200
tacgttaaca accccgaggc tacaaacgct ctcatcgaca aggacggctg gctgcacagc   1260
ggcgacatcg cctactggga cgaggacgag cacttcttca tcgtggaccg gctgaagagc   1320
ctgatcaaat acaagggcta ccaggtagcc ccagccgaac tggagagcat cctgctgcaa   1380
caccccaaca tcttcgacgc cggggtcgcc ggcctgcccg acgacgatgc cggcgagctg   1440
cccgccgcag tcgtcgtgct ggaacacggt aaaaccatga ccgagaagga gatcgtggac   1500
tatgtggcca gccaggttac aaccgccaag aagctgcgcg tggtgttgt gttcgtggac    1560 gaggtgccta aaggactgac cggcaagttg gacgcccgca agatccgcga gattctcatt   1620
aaggccaaga agggcggaaa gatcgccgtg taa                                1653

<210> SEQ ID NO 9
<211> LENGTH: 204
<212> TYPE: DNA
<213> ORGANISM: Artificial Sequence
<220> FEATURE:
<223> OTHER INFORMATION: synthetic DNA BGH-polyA

<400> SEQUENCE: 9
cgactgtgcc ttctagttgc cagccatctg ttgtttgccc ctcccccgtg ccttccttga     60
ccctggaagg tgccactccc actgtccttt cctaataaaa tgaggaaatt gcatcgcatt   120
gtctgagtag gtgtcattct attctggggg gtggggtggg gcaggacagc aagggggagg   180
attgggaaga gaatagcagg catg                                          204

<210> SEQ ID NO 10
<211> LENGTH: 717
<212> TYPE: DNA
<213> ORGANISM: Artificial Sequence
<220> FEATURE:
<223> OTHER INFORMATION: synthetic DNA sfGFP

<400> SEQUENCE: 10
atgagcaaag gagaagaact tttcactgga gttgtcccaa ttcttgttga attagatggt    60
gatgttaatg ggcacaaatt ttctgtccgt ggagagggtg aaggtgatgc tacaaacgga   120
aaactcaccc ttaaatttat ttgcactact ggaaaactac ctgttccgtg gccaacactt   180
gtcactactc tgacctatgg tgttcaatgc ttttcccgtt atccggatca catgaaacgg   240
catgactttt tcaagagtgc catgcccgaa ggttatgtac aggaacgcac tatatctttc   300
aaagatgacg ggacctacaa gacgcgtgct gaagtcaagt ttgaaggtga tacccttgtt   360
aatcgtatcg agttaaaggg tattgatttt aaagaagatg gaaacattct tggacacaaa   420
ctcgagtaca actttaactc acacaatgta tacatcacgg cagacaaaca aaagaatgga   480
atcaaagcta acttcaaaat tcgccacaac gttgaagatg gttccgttca actagcagac   540
cattatcaac aaaatactcc aattggcgat ggccctgtcc ttttaccaga caaccattac   600
ctgtcgacac aatctgtcct ttcgaaagat cccaacgaaa agcgtgacca catggtcctt   660
cttgagtttg taactgctgc tgggattaca catggcatgg atgagctcta caaataa      717
```

<210> SEQ ID NO 11
<211> LENGTH: 255
<212> TYPE: DNA
<213> ORGANISM: Artificial Sequence
<220> FEATURE:
<223> OTHER INFORMATION: synthetic DNA human serpinA1 promoter

<400> SEQUENCE: 11

```
aatgactcct ttcggtaagt gcagtggaag ctgtacactg cccaggcaaa gcgtccgggc    60
agcgtaggcg ggcgactcag atcccagcca gtggacttag cccctgtttg ctcctccgat   120
aactggggtg accttggtta atattcacca gcagcctccc ccgttgcccc tctggatcca   180
ctgcttaaat acggacgagg acagggccct gtctcctcag cttcaggcac caccactgac   240
ctgggacagt gaatc                                                    255
```

<210> SEQ ID NO 12
<211> LENGTH: 130
<212> TYPE: DNA
<213> ORGANISM: Artificial Sequence
<220> FEATURE:
<223> OTHER INFORMATION: synthetic DNA 5 prime AAV ITR 1

<400> SEQUENCE: 12

```
ctgcgcgctc gctcgctcac tgaggccgcc cgggcaaagc ccgggcgtcg gcgacctttt    60
ggtcgcccgg cctcagtgag cgagcgagcg cgcagagagg gagtggccaa ctccatcact   120
aggggttcct                                                         130
```

<210> SEQ ID NO 13
<211> LENGTH: 130
<212> TYPE: DNA
<213> ORGANISM: Artificial Sequence
<220> FEATURE:
<223> OTHER INFORMATION: synthetic DNA 3 prime AAV ITR 1

<400> SEQUENCE: 13

```
aggaacccct agtgatggag ttggccactc cctctctgcg cgctcgctcg ctcactgagg    60
ccgggcgacc aaaggtcgcc cgacgcccgg gctttgcccg gcggcctcag tgagcgagc   120 gagcgcgcag                                                         130
```

<210> SEQ ID NO 14
<211> LENGTH: 92
<212> TYPE: DNA
<213> ORGANISM: Artificial Sequence
<220> FEATURE:
<223> OTHER INFORMATION: synthetic DNA mvm intron

<400> SEQUENCE: 14

```
aagaggtaag ggtttaaggg atggttggtt ggtggggtat taatgtttaa ttacctggag    60
cacctgcctg aaatcacttt ttttcaggtt gg                                  92
```

<210> SEQ ID NO 15
<211> LENGTH: 131
<212> TYPE: DNA
<213> ORGANISM: Artificial Sequence
<220> FEATURE:
<223> OTHER INFORMATION: SV40-polyA

<400> SEQUENCE: 15

```
aacttgttta ttgcagctta taatggttac aaataaagca atagcatcac aaatttcaca    60
aataaagcat ttttttcact gcattctagt tgtggtttgt ccaaactcat caatgtatct   120
```
tatcatgtct g                                                                      131

<210> SEQ ID NO 16
<211> LENGTH: 5319
<212> TYPE: DNA
<213> ORGANISM: Artificial Sequence
<220> FEATURE:
<223> OTHER INFORMATION: synthetic DNA GTRluc

<400> SEQUENCE: 16

| | | | | | |
|---|---|---|---|---|---|
| gagggcctat | ttcccatgat | tccttcatat | ttgcatatac | gatacaaggc | tgttagagag | 60 |
| ataattggaa | ttaatttgac | tgtaaacaca | aagatattag | tacaaaatac | gtgacgtaga | 120 |
| aagtaataat | ttcttgggta | gtttgcagtt | ttaaaattat | gttttaaaat | ggactatcat | 180 |
| atgcttaccg | taacttgaaa | gtatttcgat | ttcttggctt | tatatatctt | gtggaaagga | 240 |
| cgaaacaccg | ggtcttcgag | aagacctgtt | ttagagctag | aaatagcaag | ttaaaataag | 300 |
| gctagtccgt | tatcaacttg | aaaaagtggc | accgagtcgg | tgcttttttg | ttttagagct | 360 |
| agaaatagca | agttaaaata | aggctagtcc | gtttttagcg | cgtgcgccaa | ttctgcagac | 420 |
| aaatggcttc | tagaggtacc | cctgcaggca | gctgcgcgct | cgctcgctca | ctgaggccgc | 480 |
| ccgggcaaag | cccgggcgtc | gggcgacctt | tggtcgcccg | gcctcagtga | gcgagcgagc | 540 |
| gcgcagagag | ggagtggcca | actccatcac | taggggttcc | tgcggccgcc | gttacataac | 600 |
| ttacggtaaa | tggcccgcct | ggctgaccgc | ccaacgaccc | ccgcccattg | acgtcaatag | 660 |
| taacgccaat | agggactttc | cattgacgtc | aatgggtgga | gtatttacgg | taaactgccc | 720 |
| acttggcagt | acatcaagtg | tatcatatgc | caagtacgcc | ccctattgac | gtcaatgacg | 780 |
| gtaaatggcc | cgcctggcat | tgtgcccagt | acatgacctt | atgggacttt | cctacttggc | 840 |
| agtacatcta | cgtattagtc | atcgctatta | ccatggtcga | ggtgagcccc | acgttctgct | 900 |
| tcactctccc | catctccccc | cctccccac | ccccaatttt | gtatttattt | attttttaat | 960 |
| tattttgtgc | agcgatgggg | gcggggggggg | ggggggggcg | cgcgccaggc | ggggcggggc | 1020 |
| gggcgagggg | gcgggcggg | gcgaggcgga | gaggtgcggc | ggcagccaat | cagagcggcg | 1080 |
| cgctccgaaa | gtttcctttt | atggcgaggc | ggcggcggcg | gcggccctat | aaaaagcgaa | 1140 |
| gcgcgcggcg | ggcgggagtc | gctgcgacgc | tgccttcgcc | ccgtgccccg | ctccgccgcc | 1200 |
| gcctcgcgcc | gcccgccccg | gctctgactg | accgcgttac | tcccacaggt | gagcgggcgg | 1260 |
| gacggccctt | ctcctccggg | ctgtaattag | ctgagcaaga | ggtaagggtt | taagggatgg | 1320 |
| ttggttggtg | gggtattaat | gtttaattac | ctggagcacc | tgcctgaaat | cacttttttt | 1380 |
| caggttggac | cggtccacca | tgacttcgaa | agtttatgat | ccagaacaaa | ggaaacggat | 1440 |
| gataactggt | ccgcagtggt | gggccagatg | taaacaaatg | aatgttcttg | attcattat | 1500 |
| taattattat | gattcagaaa | aacatgcaga | aaatgctgtt | attttttac | atggtaacgc | 1560 |
| ggcctcttct | tatttatggc | gacatgttgt | gccacatatt | gagccagtag | cgcggtgtat | 1620 |
| tataccagac | cttattggta | tgggcaaatc | aggcaaatct | ggtaatggtt | cttataggtt | 1680 |
| acttgatcat | tacaaatatc | ttactgcatg | gtttgaactt | cttaatttac | caaagaagat | 1740 |
| cattttgtc | ggccatgatt | ggggtgcttg | tttggcattt | cattatagct | atgagcatca | 1800 |
| agataagatc | aaagcaatag | ttcacgctga | agtgtagta | gatgtgattg | aatcatggga | 1860 |
| tgaatggcct | gatattgaag | aagatattgc | gttgatcaaa | tctgaagaag | agaaaaaat | 1920 |
| ggttttggag | aataacttct | tcgtggaaac | catgttgcca | tcaaaaatca | tgagaaagtt | 1980 |
| agaaccagaa | gaatttgcag | catatcttga | accattcaaa | gagaaaggtg | aagttcgtcg | 2040 |

```
tccaacatta tcatggcctc gtgaaatccc gttagtaaaa ggtggtaaac ctgacgttgt    2100
acaaattgtt aggaattata atgcttatct acgtgcaagt gatgatttac caaaaatgtt    2160
tattgaatcg gacccaggat tcttttccaa tgctattgtt gaaggtgcca agaagtttcc    2220
taatactgaa tttgtcaaag taaaaggtct tcattttcg caagaagatg cacctgatga    2280
aatgggaaaa tatatcaaat cgttcgttga gcgagttctc aaaaatgaac aataagaatt    2340
cctagagctc gctgatcagc ctcgactgtg ccttctagtt gccagccatc tgttgtttgc    2400
ccctcccccg tgccttcctt gaccctggaa ggtgccactc ccactgtcct ttcctaataa    2460
aatgaggaaa ttgcatcgca ttgtctgagt aggtgtcatt ctattctggg ggtgggggtg    2520
gggcaggaca gcaaggggga ggattgggaa gagaatagca ggcatgctgg ggagcggccg    2580
caggaacccc tagtgatgga gttggccact ccctctctgc gcgctcgctc gctcactgag    2640
gccgggcgac caaggtcgc ccgacgcccg ggctttgccc gggcggcctc agtgagcgag    2700
cgagcgcgca gctgcctgca ggggcgcctg atgcggtatt ttctccttac gcatctgtgc    2760
ggtatttcac accgcatacg tcaaagcaac catagtacgc gccctgtagc ggcgcattaa    2820
gcgcggcggt gtggtggtt acgcgcagcg tgaccgctac acttgccagc gccctagcgc    2880
ccgctccttt cgctttcttc ccttcctttc tcgccacgtt cgccggcttt ccccgtcaag    2940
ctctaaatcg gggggtccct ttaggggtcc gatttagtgc tttacggcac ctcgaccccca    3000 aaaaacttga tttgggtgat ggttcacgta gtgggccatc gccctgatag acggttttc    3060 gcccttgac gttggagtcc acgttcttta atagtggact cttgttccaa actggaacaa    3120
cactcaaccc tatctcgggc tattcttttg atttataagg gattttgccg atttcggcct    3180
attggttaaa aaatgagctg atttaacaaa aatttaacgc gaattttaac aaaatattaa    3240
cgtttacaat tttatggtgc actctcagta caatctgctc tgatgccgca tagttaagcc    3300
agccccgaca cccgccaaca cccgctgacg cgccctgacg ggcttgtctg ctcccggcat    3360
ccgcttacag acaagctgtg accgtctccg ggagctgcat gtgtcagagg ttttcaccgt    3420
catcaccgaa acgcgcgaga cgaaagggcc tcgtgatacg cctatttttta taggttaatg    3480 tcatgataat aatggtttct tagacgtcag gtggcacttt tcggggaaat gtgcgcggaa    3540
cccctatttg tttattttc taaatacatt caaatatgta tccgctcatg agacaataac    3600
cctgataaat gcttcaataa tattgaaaaa ggaagagtat gagtattcaa catttccgtg    3660
tcgcccttat tcccttttt gcggcatttt gccttcctgt ttttgctcac ccagaaacgc    3720
tggtgaaagt aaaagatgct gaagatcagt tgggtgcacg agtgggttac atcgaactgg    3780
atctcaacag cggtaagatc cttgagagtt ttcgccccga agaacgtttt ccaatgatga    3840 gcactttta agttctgcta tgtggcgcgg tattatcccg tattgacgcc gggcaagagc    3900
aactcggtcg ccgcatacac tattctcaga atgacttggt tgagtactca ccagtcacag    3960
aaaagcatct tacggatggc atgacagtaa gagaattatg cagtgctgcc ataaccatga    4020
gtgataacac tgcggccaac ttacttctga caacgatcgg aggaccgaag gagctaaccg    4080
cttttttgca caacatgggg gatcatgtaa ctcgccttga tcgttgggaa ccggagctga    4140
atgaagccat accaaacgac gagcgtgaca ccacgatgcc tgtagcaatg gcaacaacgt    4200
tgcgcaaact attaactggc gaactactta ctctagcttc ccggcaacaa ttaatagact    4260
ggatggaggc ggataaagtt gcaggaccac ttctgcgctc ggcccttccg gctggctggt    4320
ttattgctga taaatctgga gccggtgagc gtggaagccg cggtatcatt gcagcactgg    4380
```

```
ggccagatgg taagccctcc cgtatcgtag ttatctacac gacggggagt caggcaacta    4440
tggatgaacg aaatagacag atcgctgaga taggtgcctc actgattaag cattggtaac    4500
tgtcagacca agtttactca tatatacttt agattgattt aaaacttcat ttttaattta    4560
aaaggatcta ggtgaagatc cttttgata atctcatgac caaaatccct taacgtgagt    4620
tttcgttcca ctgagcgtca gacccgtag aaaagatcaa aggatcttct tgagatcctt    4680
tttttctgcg cgtaatctgc tgcttgcaaa caaaaaaacc accgctacca gcggtggttt    4740
gtttgccgga tcaagagcta ccaactcttt ttccgaaggt aactggcttc agcagagcgc    4800
agataccaaa tactgtcctt ctagtgtagc cgtagttagg ccaccacttc aagaactctg    4860
tagcaccgcc tacatacctc gctctgctaa tcctgttacc agtggctgct gccagtggcg    4920
ataagtcgtg tcttaccggg ttggactcaa gacgatagtt accggataag gcgcagcggt    4980
cgggctgaac ggggggttcg tgcacacagc ccagcttgga gcgaacgacc tacaccgaac    5040
tgagatacct acagcgtgag ctatgagaaa gcgccacgct tcccgaaggg agaaaggcgg    5100
acaggtatcc ggtaagcggc agggtcgaa caggagagcg cacgagggag cttccagggg    5160
gaaacgcctg gtatctttat agtcctgtcg ggtttcgcca cctctgactt gagcgtcgat    5220
ttttgtgatg ctcgtcaggg gggcggagcc tatggaaaaa cgccagcaac gcggcctttt    5280
tacggttcct ggccttttgc tggccttttg ctcacatgt                          5319
```

ISOLATED NUCLEIC ACID MOLECULE AND APPLICATION THEREOF

CROSS-REFERENCE TO RELATED APPLICATIONS

This application is a National Stage entry under 35 U.S.C. § 371 of PCT/CN2020/138395, filed on Dec. 22, 2020, and claims priority to Chinese Patent Application No. 201911342624.0, filed on Dec. 23, 2019, the entire contents of which are incorporated herein by reference.

TECHNICAL FIELD

The present application relates to the field of biomedicine, and in particular, relates to an isolated nucleic acid molecule. The isolated nucleic acid molecule contains a liver-specific expression regulatory element, and can increase the expression level of a gene of interest in the liver or hepatocytes.

BACKGROUND ART

With the development of molecular biology, gene therapy has been used in experiments and clinical applications for treating a series of disorders and diseases, comprising related diseases caused by protein synthesis dysfunction in the liver. Due to its protein post-translational modification function, the liver has become an important target organ for genetic treatment of hereditary blood diseases. Liver gene therapy can introduce a functional gene into an individual with gene defects, and allow the gene to express efficiently in vivo for a long time. However, at present, the main factor restricting the liver gene therapy is the low-level expression of gene in the liver. One of the reasons for the low-level expression lies in weak transcriptional activity. To enhance the high-level expression of gene in vivo, it is necessary to construct a high-efficiency expression regulatory sequence in the liver. In order to promote the expression of a gene of interest in a host cell, the gene of interest is usually comprised in a construct that also contains various regulatory elements necessary for expressing the gene of interest. These regulatory elements may comprise, for example, a promoter, an enhancer, an initiation signal, a termination signal, and other regulating elements. The ideal synergy between elements can not only promote the stable expression of the gene of interest in the host cell, but also achieve an expression level that is sufficient to realize the function or activity of the gene of interest. The promoter and other regulatory elements determine cell type specificity, transduction efficiency, expression level, and duration. It may be difficult to achieve the high-efficiency stable expression of the gene of interest in the host cell. Therefore, there is an urgent need of developing a nucleic acid molecule or vector to facilitate the high-efficiency stable expression of a gene of interest in a host cell (such as a liver cell).

SUMMARY OF THE INVENTION

The present application provides an isolated nucleic acid molecule, comprising a liver-specific expression regulatory element and a gene of interest, wherein the liver-specific expression regulatory element can significantly increase the expression level of the gene of interest. For example, compared with a conventional promoter (e.g., a promoter of a human serpinAl gene), the liver-specific expression regulatory element of the present application can increase the expression level of the gene of interest by at least 100%, at least 150%, at least 200%, at least 250%, at least 300%, at least 450%, at least 500% or higher. Moreover, the capability of the liver-specific expression regulatory element of the present application for increasing the expression level of the gene of interest is not affected by other elements, such as an intron, a polyadenylation signal sequence, and the type of the gene of interest, of the expression vector. The liver-specific expression regulatory element of the present application can allow the gene of interest to stably express at high efficiency in a host cell (such as a liver cell).

In one aspect, the present application provides an isolated nucleic acid molecule, comprising, in a 5'-to-3' direction, a liver-specific expression regulatory element and a gene of interest operably linked to the liver-specific expression regulatory element, wherein compared with an expression regulatory element with a nucleotide sequence as set forth in SEQ ID NO: 11, said liver-specific expression regulatory element increases the expression level of said gene of interest in liver or hepatocytes by at least 100%.

In some embodiments, the liver-specific expression regulatory element in the isolated nucleic acid molecule of the present application comprises:
a) a promoter derived from a dog serpinAl gene or a functional fragment thereof;
b) a promoter derived from a *Xenopus laevis* vitellogenin A2 gene or a functional fragment thereof;
c) a promoter derived from a *Xenopus laevis* albumin gene or a functional fragment thereof; and
d) a promoter derived from a human serpinAl gene or a functional fragment thereof.

In some embodiments, the promoter derived from the dog serpinAl gene or the functional fragment thereof in the isolated nucleic acid molecule of the present application comprises a nucleotide sequence as set forth in SEQ ID NO: 2.

In some embodiments, the promoter derived from the *Xenopus laevis* vitellogenin A2 gene or the functional fragment thereof in the isolated nucleic acid molecule of the present application comprises a nucleotide sequence as set forth in SEQ ID NO: 3.

In some embodiments, the promoter derived from the *Xenopus laevis* albumin gene or the functional fragment thereof in the isolated nucleic acid molecule of the present application comprises a nucleotide sequence as set forth in SEQ ID NO: 4.

In some embodiments, the promoter derived from the human serpinAl gene or the functional fragment thereof in the isolated nucleic acid molecule of the present application comprises a nucleotide sequence as set forth in SEQ ID NO: 5.

In some embodiments, the liver-specific expression regulatory element in the isolated nucleic acid molecule of the present application comprises, in order in the 5'-to-3' direction: the promoter derived from the dog serpinAl gene or the functional fragment thereof, the promoter derived from the *Xenopus laevis* vitellogenin A2 gene or the functional fragment thereof, the promoter derived from the *Xenopus laevis* albumin gene or the functional fragment thereof, and the promoter derived from the human serpinAl gene or the functional fragment thereof.

In some embodiments, the isolated nucleic acid molecule of the present application further comprises an intron located between the liver-specific expression regulatory element and the gene of interest.

In some embodiments, the intron in the isolated nucleic acid molecule of the present application is an SV40 intron or an MVM intron.

In some embodiments, the isolated nucleic acid molecule of the present application further comprises a polyadenylation signal sequence located at a 3'-terminal of the gene of interest.

In some embodiments, the polyadenylation signal sequence in the isolated nucleic acid molecule of the present application is a BGH-polyA signal sequence or an SV40 polyA signal sequence.

In some embodiments, the isolated nucleic acid molecule of the present application further comprises a Kozac sequence located between the liver-specific expression regulatory element and the gene of interest.

In some embodiments, the isolated nucleic acid molecule of the present application comprises, in order in the 5'-to-3' direction: the liver-specific expression regulatory element, the intron, the Kozac sequence, the gene of interest, and the polyadenylation signal sequence.

In some embodiments, the gene of interest in the isolated nucleic acid molecule of the present application encodes a protein of interest, and the protein of interest comprises a reporter protein and/or a therapeutic protein.

In some embodiments, the protein of interest comprises sfGFP and firefly luciferase.

In some embodiments, the protein of interest in the isolated nucleic acid molecule of the present application comprises an amino acid sequence as set forth in any one of SEQ ID NOs: 8 and 10.

In some embodiments, the isolated nucleic acid molecule of the present application further comprises AAV inverted terminal repeats ITRs located at a 5'-terminal of the liver-specific expression regulatory element and at the 3'-terminal of the gene of interest.

In some embodiments, the AAV ITR in the isolated nucleic acid molecule of the present application is derived from an AAV serotype selected from the group consisting of: AAV2.

In some embodiments, the AAV ITR in the isolated nucleic acid molecule of the present application comprises a nucleotide sequence as set forth in any one in the group consisting of SEQ ID NOs.: 12-13.

In another aspect, the present application further provides a vector, which may contain the isolated nucleic acid molecule.

In some embodiments, the vector of the present application is a viral vector or a polynucleotide vector.

In some embodiments, the vector of the present application is a plasmid, a cosmid or a transposon.

In some embodiments, the vector of the present application is a viral vector, wherein the viral vector comprises an AAV vector.

In another aspect, the present application further provides a host cell, which contains the isolated nucleic acid molecule or vector as defined.

In another aspect, the present application further provides a diagnostic or pharmaceutical composition, comprising the isolated nucleic acid molecule, the vector, or the host cell, as defined.

In another aspect, the present application further provides a method for expressing a gene of interest, comprising introducing the isolated nucleic acid molecule or vector as defined into a host cell, and allowing the gene of interest to be expressed in the host cell.

In another aspect, the present application further provides a kit, which comprises the isolated nucleic acid molecule as defined, the vector as defined, or the host cell as defined.

Other aspects and advantages of the present application can be readily perceived by those skilled in the art from the detailed description below. The detailed description below only shows and describes the exemplary embodiments of the present application. As would be appreciated by those skilled in the art, the content of the present application allows those killed in the art to change the specific embodiments disclosed without departing from the spirit and scope involved in the present application. Accordingly, the accompanying drawings and the description in the specification of the present application are merely for an exemplary but not restrictive purpose.

BRIEF DESCRIPTION OF THE DRAWINGS

The specific features of the present invention involved in the present application are listed in the appended claims. The characteristics and advantages of the present invention involved in the present application can be better understood by referring to the exemplary embodiments and the accompanying drawings described in detail below. A brief description of the drawings is as follows:

DETAILED DESCRIPTION OF THE INVENTION

The embodiments of the invention of the present application will be illustrated by specific examples below. Those familiar with this technology can easily understand other advantages and effects of the invention of the present application from the content disclosed in the specification.

In the present application, the term "isolated" generally refers to that a biological component (such as a nucleic acid molecule, a protein, a virus, or a cell) is purified to be substantially free of other cellular components (such as other chromosomes and extrachromosomal DNA and RNA, proteins and cells) related thereto in a naturally occurring condition. The isolated nucleic acid molecule and protein comprise those purified by a standard purification method. This term also involves nucleic acid molecules and proteins prepared by recombinant expression in host cells, and chemically synthesized nucleic acid molecules and proteins.

In the present application, the term "promoter" generally refers to an essential nucleic acid sequence used to promote the transcription of a downstream (3'-terminal) or upstream (5'-terminal) nucleic acid sequence. A promoter is generally located in the vicinity of a gene to be transcribed thereby. The promoter also comprises a terminal enhancer or repressor element, which can be located several thousands of base pairs from a transcription start site. The term "functional fragment" as used herein is a fragment of a polypeptide or polynucleotide that retains the same activity or ability as its larger counterpart (e.g., a promoter). The activity level of the functional fragment may be the same as, or lower or higher than, the activity level of the mentioned larger counterpart. For example, the functional fragment of a promoter may be composed of polynucleotides fewer than those of the promoter, but still retain the ability of promoting transcription.

In the present application, the term "dog serpinAl gene" generally refers to a gene encoding al-antitrypsin. In some cases, the dog as described may be a dog with the Latin name *Canis lupus familiaris*. In another case, the "dog serpinAl gene" may comprise a nucleotide sequence as set forth from a position 63,388,498 to a position 63,400,377 of a chromosome 8 (for its sequence, refer to NCBI Accession No. NC_006590.3), or a variant thereof. The promoter of the "dog serpinAl gene" may comprise the nucleotide sequence as set forth from a position 63,398,647 to a position 63,398,492 of a reverse strand of the chromosome 8, or a variant thereof.

In the present application, the terms "*Xenopus laevis* vitellogenin A2 gene" and "Xe VA2" are used interchangeably and generally refers to a nucleotide sequence comprising that as set forth in GenBank Accession No. X00205.1. The promoter may comprise a nucleic acid sequence from a position 900 to a position 935 of the above-mentioned sequence.

In the present application, the term "*Xenopus laevis* albumin gene" generally refers to a nucleic acid sequence comprising that as set forth in GenBank Accession No. Z26825.1. Its promoter may comprise the nucleotide sequence from position 1540 to position 1605 of the above-mentioned sequence.

In the present application, the term "human serpinAl gene" generally refers to a nucleotide sequence comprising that as set forth in NCBI Accession No. NM_000295. Its promoter may comprise the nucleotide sequence from position 226 to position 257 of the above-mentioned sequence.

In the present application, the terms "polyadenylation signal sequence" and "polyA signal sequence" generally refer to a nucleic acid sequence for inducing the cleavage and polyadenylation of a primary transcript of a specific nucleic acid sequence segment. The polyadenylation signal sequence can be selected from polyadenylation signal sequences derived from SV40, a bovine growth hormone (BGH) gene, an immunoglobulin gene, and a thymidine kinase gene (tk, e.g., a herpes simplex virus thymidine kinase polyadenylation signal).

In the present application, the term "gene of interest" generally refers to an exogenous DNA or cDNA, which is comprised in a nucleic acid molecule, vector, host cell or kit and is capable of encoding a gene product. The gene product may be a polypeptide, a protein, or a polynucleotide (e.g., antisense DNA, miRNA, siRNA, and shRNA) that is inherently functional or active.

In the present application, the term "operably linked" generally refers to that a first nucleic acid sequence and a second nucleic acid sequence are operably linked when the first and second nucleic acid sequences are in a functional relationship. For example, if a promoter affects the transcription or expression of a coded sequence, the promoter and the coded sequence are operably linked.

In the present application, the term "sfGFP" generally refers to superfold GFP, i.e., superfold green fluorescent protein.

In the present application, the term "AAV vector" or "adeno-associated virus vector" generally refers to a vector derived from naturally occurring and available adeno-associated virus and artificial AAV. The AAV may comprise different serotypes such as AAV1, AAV2, AAV3, AAV4, AAV5, AAV6, AAV7, AAV8, AAV9, AAV10, AAV11, AAV12 or AAV13, as well as any AAV variants or a mixture thereof. Inverted terminal repeats (ITR) are generally present at both ends of an AAV genome. The term "ITR" or "inverted terminal repeat" refers to a nucleic acid sequence segment that is present in an AAV and/or a recombinant AAV. It can form a T-shaped palindrome structure required for completing AAV solubilization and a latent life cycle.

In the present application, the term "reporter protein" generally refers to a protein that provides an analytically identifiable signal by biochemical nature, thus permitting detection. Commonly used reporter proteins may be enzymes, fluorophores, and chemiluminescence or electro-chemiluminescence proteins.

In the present application, the term "therapeutic protein" generally refers to a protein that can be used to treat, prevent, or ameliorate a disease, condition, or disorder.

In the present application, the term "prophylactic protein" generally refers to a protein that can be used to prevent a disorder or disease before any symptoms of the disorder or disease are detected.

In the present application, the term "host cell" generally refers to a cell, such as a mammalian cell, that has been transfected with a nucleic acid sequence or is capable of being transfected with a nucleic acid sequence to consequently express a gene of interest. The "host cell" comprises a parent cell and a progeny cell thereof, and it is enough as long as the progeny cell can be transferred into a gene of interest or the gene of interest already exists, regardless of whether the progeny cell is identical to the original parent cell in terms of morphology or genetic structure.

Therefore, the present invention comprises the variants of gene and protein (e.g., the variant of a protein-encoding polynucleotide described herein), which retain one or more biological activities. Such variant of protein or polypeptide comprises a protein or polypeptide that has been or can be modified using a recombinant DNA technology in such a way that the protein or polypeptide has altered or additional properties. For example, the variant endows the protein with an enhanced stability in plasma or with an enhanced activity. The variant may be different from a reference sequence, such as a naturally occurring polynucleotide, protein or peptide. At a nucleotide sequence level, the naturally occurring variant gene and the non-naturally occurring variant gene would show typically at least about 50%, more typically at least about 70%, and even more typically at least about 80% (90% or higher), identity with a reference gene. At an amino acid sequence level, a naturally-occurring mutant protein and a non-naturally occurring mutant protein would show typically at least about 70%, more typically at least about 80%, and even more typically at least about 90% or higher, identity with a reference protein, but a largely non-identity region is allowed in a non-conserved region (for example, the proportion of identical portions is less than 70%, such as less than 60%, less than 50%, or even less than 40%). In other embodiments, the sequence has at least 60%, 70%, 75% or higher identity (e.g., 80%, 85%, 90%, 95%, 96%, 97%, 98%, 99% or higher identity) with a reference sequence. For those skilled in the art, procedures for introducing the changes of nucleotide and amino acid into a polynucleotide, protein, or peptide are known (see, for example, Sambrook et al. (1989)).

In the present application, the terms "identity", "homology" and their grammatical variants generally refer to the fact that two or more entities are considered to be the same if they are "aligned" sequences. Therefore, for example, when two polypeptide sequences are the same, they have the same amino acid sequence at least within a region or portion to which a reference is made. If two polynucleotide sequences are the same, they have the same polynucleotide sequence at least within a region or portion to which a reference is made. The identity may involve a defined zone (region or domain) of the sequence. An identity "zone" or "region" refers to the same portion between two or more entities to which a reference is made. Therefore, if two protein or nucleic acid sequences are the same in one or more sequence zones or regions, they show identity in that region. "Aligned" sequences refer to a plurality of polynucleotide or protein (amino acid) sequences, which, compared with a reference sequence, often contain a base or an amino acid (gap) that is supplemented for deletion or added. The degree of identity (homology) between two sequences can be determined using a computer program and a mathematical algorithm. Such an algorithm for calculating percentage sequence identity (homology) is generally used to calculate a sequence gap and mismatch between compared regions or zones. For example, BLAST (e.g., BLAST 2.0) search algorithm (see, e.g., Altschul et al.,J.Mol.Biol. 215: 403 (1990), publicly available through NCBI) has the following exemplary search parameters: mismatch: −2, gap opening: 5, and gap extension: 2.

In the present application, the term "comprise" generally refers to the inclusion of explicitly specified features, but not excluding other elements.

In the present application, the term "about" generally refers to a variation within a range of 0.5%-10% above or below a specified value, for example, a variation within a range of 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, and 10% above or below a specified value.

Isolated Nucleic Acid Molecule

In one aspect, the present application provides an isolated nucleic acid molecule, comprising, in a 5'-to-3' direction, a liver-specific expression regulatory element and a gene of interest operably linked to the liver-specific expression regulatory element.

Expression Regulatory Element

In the present application, the term "expression regulatory element" generally refers to a nucleic acid sequence, such as an enhancer and a promoter, which affects the expression of an operably linked polynucleotide. These elements may be operated in cis or trans. Expression regulation may work in transcription, translation, splicing, message stability and other levels. Generally, expression regulatory elements for regulating transcription are juxtaposed near the 5'-terminal (i.e., "upstream") of the polynucleotide being transcribed. The expression regulatory element may also be located at the 3'-terminal (i.e., "downstream") of a transcribed sequence or within a transcript (e.g., within an intron). A specific example of the expression regulatory element is a promoter, which is usually located at the 5'-terminal of the transcribed sequence. The expression regulatory element may also comprise a ubiquitous or promiscuous promoter, making it possible to promote the expression of a polynucleotide in many different cell types. The term "tissue-specific expression regulatory element" generally refers to an expression regulatory element that is active in a specific tissue or cell, such as in the liver, brain, central nervous system, spinal cord, eyes, or lungs.

In some cases, the liver-specific expression regulatory element of the present application may comprise a promoter derived from a dog serpinAl gene or a functional fragment thereof. The promoter derived from the dog serpinAl gene may be a modified variant of a wild-type dog serpinAl gene promoter. For example, the promoter derived from the dog serpinAl gene or the functional fragment thereof may comprise a nucleotide sequence as set forth in SEQ ID NO: 2, or a nucleic acid sequence having at least 90% (for example, at least 91%, at least 92%, at least 93%, at least 94%, at least 95%, at least 96%, at least 97%, at least 98%, or at least 99%) identity therewith.

In some cases, the expression regulatory element of the present application may comprise a promoter derived from a *Xenopus laevis* vitellogenin A2 gene or a functional fragment thereof. The promoter derived from the *Xenopus laevis* vitellogenin A2 gene or the functional fragment thereof may comprise a nucleotide sequence as set forth in SEQ ID NO: 3, or a nucleic acid sequence having at least 90% (for example, at least 91%, at least 92%, at least 93%, at least 94%, at least 95%, at least 96%, at least 97%, at least 98%, or at least 99%) identity therewith.

In some cases, the expression regulatory element may comprise a promoter derived from a *Xenopus laevis* albumin gene or a functional fragment thereof. The promoter derived from the *Xenopus laevis* albumin gene or the functional fragment thereof may comprise a nucleotide sequence as set forth in SEQ ID NO: 4, or a nucleic acid sequence having at least 90% (for example, at least 91%, at least 92%, at least 93%, at least 94%, at least 95%, at least 96%, at least 97%, at least 98%, or at least 99%) identity therewith.

In some cases, the expression regulatory element may comprise a promoter derived from a human serpinAl gene or a functional fragment thereof. The promoter derived from the human serpinAl gene or the functional fragment thereof may comprise a nucleotide sequence as set forth in SEQ ID NO: 5, or a nucleic acid sequence having at least 90% (for example, at least 91%, at least 92%, at least 93%, at least 94%, at least 95%, at least 96%, at least 97%, at least 98%, or at least 99%) identity therewith.

The liver-specific expression regulatory element of the present application may comprise: a) the promoter derived from the dog serpinAl gene or the functional fragment thereof; b) the promoter derived from the *Xenopus laevis* vitellogenin A2 gene or the functional fragment thereof; c) the promoter derived from the *Xenopus laevis* albumin gene or the functional fragment thereof; and d) the promoter derived from the human serpinAl gene or the functional fragment thereof.

In some cases, the liver-specific expression regulatory element comprises: in order in the 5'-to-3' direction: the promoter derived from the dog serpinAl gene or the functional fragment thereof, the promoter derived from the *Xenopus laevis* vitellogenin A2 gene or the functional fragment thereof, the promoter derived from the *Xenopus laevis* albumin gene or the functional fragment thereof, and the promoter derived from the human serpinAl gene or the functional fragment thereof.

Intron

In the present application, the isolated nucleic acid molecule may also comprise an intron. Compared with the expression without the intron, the inclusion of intron may enhance expression (Kurachi et al., 1995). The AAV vector is generally inserted by means of a DNA having a specified size range, which is usually about 4 kb to about 5.2 kb or slightly larger. Therefore, for a shorter sequence, it may be necessary to comprise an additional nucleic acid in an insert fragment in order to obtain the required length that can be accepted by the AAV vector. The intron can meet this requirement. The intron described in the present application may be located between the liver-specific expression regulatory element and the gene of interest. In some cases, the intron may be an SV40 intron, a β-globulin intron, a minute virus of mice intron (MVM), or a truncated FIX intron 1. The intron may be natural or artificial. For example, the intron may be the SV40 intron, comprising a nucleic acid sequence as set forth in SEQ ID NO: 6, or comprising a nucleic acid sequence having at least 90% (for example, at least 91%, at least 92%, at least 93%, at least 94%, at least 95%, at least 96%, at least 97%, at least 98%, or at least 99%) identity thereto. For another example, the intron may be an MVM intron, comprising a nucleic acid sequence as set forth in SEQ ID NO: 14, or comprising a nucleic acid sequence having at least 90% (for example, at least 91%, at least 92%, at least 93%, at least 94%, at least 95%, at least 96%, at least 97%, at least 98%, or at least 99%) identity thereto.

Gene of Interest

In the present application, the isolated nucleic acid molecule may also comprise a gene of interest, which is operably linked to the liver-specific expression regulatory element. The liver-specific expression regulatory element and the gene of interest may be directly adjacent to each other, or separated by a stretch of inserted nucleotides. In some cases, the liver-specific expression regulatory element and the gene of interest can be separated by an intron, such as the intron of the present application. The gene of interest can encode a polypeptide, protein, or polynucleic acid, or may itself be transcribed into a functional or active polynucleic acid, for example, an antisense nucleic acid or an inhibitory oligonucleotide, comprising antisense DNA and RNA (such as miRNA, siRNA and shRNA). In some cases, the gene of interest may encode a protein of interest, which may comprise a reporter protein. The reporter protein may be an enzyme, a fluorescent label, a molecule containing a radioisotope, and a chemiluminescence or electrochemiluminescence molecule. Exemplary reporter proteins comprise, but are not limited to, a green fluorescent protein (GFP), an enhanced green fluorescent protein (eGFP), a yellow fluorescent protein (YFP), an enhanced yellow fluorescent protein (eYFP), a cyan fluorescent protein (CFP), an enhanced cyan fluorescent protein (eCFP), a blue fluorescent protein (BFP), an enhanced blue fluorescent protein (eBFP), MmGFP (Zernicka-Goetz et al., Development, 124: 1133-1137, 1997), dsRed, luciferase and β-galactosidase (lacZ). For example, it may be firefly luciferase and *Renilla* luciferase.

In some other cases, the gene of interest may be a therapeutic gene. The therapeutic gene can encode a therapeutic peptide, a therapeutic polypeptide, a therapeutic protein, or a therapeutic polynucleic acid. The therapeutic peptide, therapeutic polypeptide, or therapeutic protein may be a peptide, polypeptide, or protein that can be used to restore or replace the function of a defective endogenous peptide, polypeptide, or protein. In some cases, the therapeutic protein or therapeutic polynucleic acid can be used to change the expression level and/or activity of one or more proteins or polynucleic acids in a host cell.

In some other cases, the gene of interest may be a prophylactic gene. The prophylactic gene can encode a prophylactic peptide, a prophylactic polypeptide, a prophylactic protein, or a prophylactic polynucleic acid. The prophylactic peptide, prophylactic polypeptide, or prophylactic protein may be a peptide, polypeptide, or protein that can be used to restore or replace the function of a defective endogenous peptide, polypeptide, or protein. In some cases, the prophylactic protein or prophylactic polynucleic acid can be used to change the expression level and/or activity of one or more proteins or polynucleic acids in a host cell.

In some cases, the protein of interest may participate in or affect cell metabolism, immune response, hematopoietic function, inflammatory response, cell growth and/or proliferation, cell differentiation, and/or stress response. Exemplary proteins of interest may comprise, but are not limited to: factor FVIII, factor FIX, factor FVII, factor FX, interferon-α, interferon-β, interferon-γ, interleukin 1 (IL-1), interleukin 2 (IL-2), interleukin 3 (IL-3), interleukin 4 (IL-4), interleukin 5 (IL-5), interleukin 6 (IL-6), interleukin 7 (IL-7), interleukin 8 (IL-8), interleukin 9 (IL-9), interleukin 10 (IL-10), interleukin 11 (IL-11), interleukin 12 (IL-12), chemokine (CXC motif) ligand 5 (CXCL5), granulocyte colony-stimulating factor (G-CSF), granulocyte-macrophage colony-stimulating factor (GM-CSF), macrophage colony-stimulating factor (M-CSF), stem cell factor (SCF), keratinocyte growth factor (KGF), monocyte chemoattractant protein-1 (MCP-1), tumor necrosis factor (TNF), afamin (AFM), α-galactosidase A, aL-iduronidase, lysosomal α-glucosidase, phenylalanine hydroxylase, lipoprotein lipase, apolipoprotein, low-density lipoprotein receptor (LDL-R), albumin, glucose-6-phosphatase, antibodies, nanobodies, antiviral dominant inactivated proteins, and their fragments, subunits or mutants.

In an example, the gene of interest can encode sfGFP, which may comprise an amino acid sequence as set forth in SEQ ID NO: 10, or comprise an amino acid sequence having at least 90% (for example, at least 91%, at least 92%, at least 93%, at least 94%, at least 95%, at least 96%, at least 97%, at least 98%, or at least 99%) identity thereto. In another example, the gene of interest can encode a firefly luciferase protein, which may comprise an amino acid sequence as set forth in SEQ ID NO: 8, or comprise an amino acid sequence having at least 90% (for example, at least 91%, at least 92%, at least 93%, at least 94%, at least 95%, at least 96%, at least 97%, at least 98%, or at least 99%) identity thereto.

Other Elements

In the present application, the isolated nucleic acid molecule may further comprise other elements that drive the expression of polynucleotides. These elements comprise, but are not limited to, transcription and translation termination signals, a translation initiation signal, a post-transcriptional regulatory element, and other elements.

In the present application, the transcription termination signals may comprise, but are not limited to, polyadenylation signal sequences, for example, polyadenylation signal sequences derived from SV40, a bovine growth hormone (BGH) gene, a rabbit β-globulin (RBG) gene, and a thymidine kinase gene (TK), and variants thereof.

In some cases, the polyadenylation signal sequence may be a BGH-polyA signal sequence. For example, the BGH-polyA signal sequence may comprise a nucleic acid sequence as set forth in SEQ ID NO: 9, or comprising a nucleic acid sequence having at least 90% (for example, at least 91%, at least 92%, at least 93%, at least 94%, at least 95%, at least 96%, at least 97%, at least 98%, or at least 99%) identity thereto. In some other cases, the polyadenylation signal sequence may be a SV40-polyA signal sequence. For example, the SV40-polyA signal sequence may comprise a nucleic acid sequence as set forth in SEQ ID NO: 15, or comprising a nucleic acid sequence having at least 90% (for example, at least 91%, at least 92%, at least 93%, at least 94%, at least 95%, at least 96%, at least 97%, at least 98%, or at least 99%) identity thereto.

In the present application, the isolated nucleic acid molecule further comprises an enhancer, which may be located at the 5'-terminal of the liver-specific expression regulatory element. For example, the enhancer may contain a nucleotide sequence as set forth in SEQ ID NO: 1.

The isolated nucleic acid molecule may further comprise a translation initiation sequence, for example, a Kozac sequence (for example, the sequence as set forth in SEQ ID NO: 7) which may be located between the liver-specific expression regulatory element and the gene of interest.

The isolated nucleic acid molecule of the present application may comprise, in order in the 5'-to-3' direction: the liver-specific expression regulatory element, the intron, the Kozac sequence, the gene of interest, and the polyadenylation signal sequence.

In some cases, the intron may be an SV40 intron, the gene of interest may be a gene encoding firefly luciferase, and the polyadenylation signal sequence may be a BGH-polyA signal sequence. For example, the isolated nucleic acid molecule of the present application may comprise, in order in the 5'-to-3' direction: the liver-specific expression regulatory element, the SV40 intron, the Kozac sequence, the gene encoding firefly luciferase, and the BGH-polyA signal sequence.

In some cases, the intron may be an SV40 intron, the gene of interest may be a gene encoding sfGFP, and the polyadenylation signal sequence may be a BGH-polyA signal sequence. For example, the isolated nucleic acid molecule of the present application may comprise, in order in the 5'-to-3' direction: the liver-specific expression regulatory element, the SV40 intron, the Kozac sequence, the gene encoding sfGFP, and the BGH-polyA signal sequence.

In some other cases, the intron may be an MVM intron, the gene of interest may be a gene encoding the firefly luciferase, and the polyadenylation signal sequence may be a BGH-polyA signal sequence. For example, the isolated nucleic acid molecule of the present application may comprise, in order in the 5'-to-3' direction: the liver-specific expression regulatory element, the MVM intron, the Kozac sequence, the gene encoding the firefly luciferase, and the BGH-polyA signal sequence.

In some other cases, the intron may be an SV40 intron, the gene of interest may be a gene encoding the firefly luciferase, and the polyadenylation signal sequence may be an SV40-polyA signal sequence. For example, the isolated nucleic acid molecule of the present application may comprise, in order in the 5'-to-3' direction: the liver-specific expression regulatory element, the SV40 intron, the Kozac sequence, the gene encoding the firefly luciferase, and the SV40-polyA signal sequence.

In any situation where the liver-specific expression of the gene of interest is desired, the liver-specific expression regulatory element of the present application can be used. The promoter of the human serpinAl gene is a promoter regulatory element in the prior art, with a nucleotide sequence as set forth in SEQ ID NO: 11. Compared with the promoter (SEQ ID NO: 11) of the human serpinAl gene, the liver-specific expression regulatory element increases the expression level of the gene of interest in the liver or hepatocytes to at least 100%. In the case of different introns (such as SV40 or MVM introns), different polyA (such as BGH-polyA or SV40-polyA), or different genes of interest (such as firefly luciferase genes or sfGFP), the liver-specific expression regulatory element of the present application increases the expression level of the gene of interest in the liver or hepatocytes by at least 100% (e.g., by at least 110%, by at least 120%, by at least 130%, by at least 140%, by at least 150%, by at least 200%, by at least 250%, by at least 300%, by at least 350%, or by at least 400%), as compared with the regulatory element as set forth in SEQ ID NO: 11. For example, when constructing a nucleic acid vector containing the liver-specific expression regulatory element of the present application, compared with the nucleic acid vector containing the promoter of the human serpinAl gene, the expression level of the sfGFP gene can be increased by at least 100% (e.g., by at least 110%, by at least 120%, by at least 130%, by at least 140%, by at least 150%, by at least 200%, by at least 250%, by at least 300%, by at least 350%, or by at least 400%), as derived in the dual-luciferase assay. For example, when constructing a nucleic acid vector containing the liver-specific expression regulatory element of the present application, compared with the nucleic acid vector containing the promoter of the human serpinAl gene, the expression level of the firefly luciferase gene can be increased by at least 100% (e.g., by at least 110%, by at least 120%, by at least 130%, by at least 140%, by at least 150%, by at least 200%, by at least 250%, by at least 300%, by at least 350%, or by at least 400%), as derived in the dual-luciferase assay.

To facilitate the packaging of a liver-specific expression regulatory element and the gene of interest into a vector (e.g., an AAV vector), the isolated nucleic acid molecule of the present application may further comprise AAV inverted terminal repeats (ITRs) located at both ends of the regulatory element and the gene of interest. For example, the ITRs may be located at a 5'-terminal of the liver-specific expression regulatory element and at the 3'-terminal of the gene of interest. The AAV ITR may be derived from any serotype of AAV, comprising but not limited to, AAV1, AAV2, AAV3, AAV4, AAV5, AAV6, AAV7, AAV8, AAV9, AAV10, AAV11, AAV12 or AAV13, and a naturally occurring or artificial variant thereof. Compared with a wild-type AAV ITR, the nucleic acid sequence comprised in the AAV ITR of the present application may be a nucleic acid sequence that has undergone nucleotide insertion, deletion, and/or substitution. Moreover, the AAV ITRs of the isolated nucleic acid molecule may be different or derived from different serotypes, as long as they have the desired function (e.g., the capability of replicating and packaging the gene of interest in gene therapy). The nucleotide sequence of AAV ITR is known in the art. In some cases, the AAV ITR of the present application may be derived from an AAV serotype selected from the group consisting of: AAV2. For example, the AAV ITR may comprise a nucleotide sequence as set forth in any one of SEQ ID NOs: 12-13. For example, the AAV ITR at the 5'-terminal may comprise a nucleotide sequence as set forth in SEQ ID NO: 12, and the AAV ITR at the 3'-terminal may comprise a nucleotide sequence as set forth in SEQ ID NO: 13.

In a specific case, the nucleotide sequence may be prepared by a cloning technology, or synthetically generated. It may also be prepared by an amplification method. The amplification method comprises polymerase chain reaction (PCR), ligase chain reaction (LCR), transcription-based amplification system (TAS), and self-sustained sequence replication system (3SR). Many methods of cloning, synthesis, and amplification are well known in the art.

Vector and Host Cell

In another aspect, the present application further provides a vector, which may contain the isolated nucleic acid molecule. The vector may be a viral vector, for example, a AAV, lentivirus, retrovirus, adenovirus, herpes virus, or hepatitis virus vector. The vector may also be a polynucleotide vector, for example, a plasmid, cosmid or transposon.

Applicable vectors have been widely described and are well known in the art. Those skilled in the art would understand that a vector containing the nucleic acid molecule of the present application may also contain other sequences and elements required for the vector to replicate in prokaryotic and/or eukaryotic cells. For example, the vector of the present application may comprise a prokaryotic replicon, i.e., a nucleotide sequence capable of guiding the host's own replication and maintenance in prokaryotic host cells (for example, bacterial host cells). The replicon is well known in the art. In some cases, the vector may contain a shuttle element, which enables the vector to adapt to replication and integration in prokaryotes and eukaryotes. In addition, the vector may also comprise a gene capable of expressing a detectable marker (for example, a drug resistance gene). The vector may also have a reporter gene, for example, a gene capable of encoding fluorescent or other detectable proteins.

In some cases, the vector may be a viral vector, for example, an AAV, lentivirus, retrovirus, adenovirus, herpes virus, and hepatitis virus vector. Methods for generating a viral vector containing a nucleic acid molecule (for example, the isolated nucleic acid molecule of the present application) as part of a vector genome are well known in the art, and those skilled in the art can perform these methods without excessive experiments. In some other cases, the vector may be a recombinant AAV virion packaging the nucleic acid molecule of the present application. A method for producing a recombinant AAV may comprise introducing the nucleic acid molecule of the present application into a packaging cell line to induce AAV infection and auxiliary functions of AAV cap and rep genes, and recovering the recombinant AAV from the supernatant of the packaging cell line. Various types of cells can be used as packaging cell lines. For example, the usable packaging cell lines comprise, but are not limited to, HEK 293 cells, HeLa cells, and Vero cells.

The present application further provides a host cell, which contains the isolated nucleic acid molecule or vector as defined. In some cases, the host cell can be used to amplify, replicate, package/or purify the nucleic acid molecule or vector. In some other cases, the host cell can be used to express the gene of interest contained in the nucleic acid molecule or vector. Therefore, the present application also encompasses a method for expressing a gene of interest, wherein the nucleic acid molecule or vector of the present application can be introduced into a host cell, for example, a liver cell. Those skilled in the art would understand the conditions required for introducing the nucleic acid molecule or vector into the host cell, as well as the conditions for supporting or promoting the expression of the gene of interest in the cell. In addition, the method may be an in vivo or in vitro method.

The host cell may comprise a prokaryotic cell and a eukaryotic cell. In some cases, the host cell may be a mammalian host cell. For example, when a host cell is used to package the viral vector, the host cell may also be transfected with one or more plasmids, or infected with one or more viruses, which can provide essential accessory molecules for packaging. In some other cases, the host cell may stably express one or more types of accessory molecules from a genome. Those skilled in the art can select an appropriate host cell for the amplification, replication, packaging and/or purification of the vector of the present application. Exemplary mammalian host cells may comprise, but are not limited to, HEK-293 cells, HeLa cells, Vero cells, HUH7 cells, and HepG2 cells. In a particular example, in order to allow the nucleic acid molecule or vector as described to express a gene of interest, the host cell may be a cell derived from the liver, for example, a huh7.5 cell, or a hepatocyte isolated from a subject.

The present application further provides a method for expressing a gene of interest, comprising introducing the isolated nucleic acid molecule or vector as defined into a host cell, and allowing the gene of interest to be expressed in the host cell.

Pharmaceutical Composition and Kit

The present application further provides a diagnostic or pharmaceutical composition, comprising the isolated nucleic acid molecule, the vector, or the host cell, as defined. AAV vectors and other compositions, medicaments, drugs, biological agents (proteins), for example, pharmaceutically acceptable carriers, diluents and adjuvants, can be incorporated into the diagnostic and pharmaceutical composition as described. The carriers, diluents and adjuvants may comprise buffers, antioxidants, low molecular weight polypeptides, proteins, amino acids, monosaccharides, chelating agents, salt-forming counter ions, and/or nonionic surfactants.

In the case where the composition contains a nucleic acid molecule or a nucleic acid molecule vector (e.g., a plasmid), the nucleic acid molecule or nucleic acid molecule vector may be present as "naked DNA" or prepared in a delivery vector, for example, microparticles or nanoparticles, comprising liposomes, micelle, lipid particles, ceramic/inorganic particles, and virus-like particles.

The pharmaceutical composition, method and application described in the present application may be administered to a subject in need thereof in a sufficient amount or an effective amount. "Effective amount" or "sufficient amount" refers to an amount provided in a single does or multiple doses alone or in combination with one or more other compositions (therapeutic agents such as drugs), treatments, regimens or therapeutic regimens, agents to achieve a detectable response of any duration (long-term or short-term), any measurable or detectable extent, or an expected or desired result or benefit of any duration (e.g., lasting for several minutes, hours, days, months, or years, or lasting until a cure). The route of administration is not particularly limited. The nucleic acid molecule or vector may be administered in a single dose or multiple doses, and at different intervals.

The present application further provides a kit, which comprises the isolated nucleic acid molecule, the vector, or the host cell, as defined. The kit also generally comprises labels or instructions, which comprise the description of components or instructions for using the components therein in vitro, in vivo, or indirectly in vivo.

Not wishing to be bound by any particular theory, the following examples are merely to illustrate the fusion protein, preparation methods and applications and the like according to the present application, and are not intended to limit the scope of the present invention.

EXAMPLES

Example 1. Construction of Vector

The nucleotide sequence of each element in a nucleic acid molecule is as follows:
the liver-specific expression regulatory element is artificially linked in order in a 5'-to-3' direction as follows: a promoter functional fragment (SEQ ID NO. 2) derived from a dog serpinAl gene, a promoter functional fragment (SEQ ID NO. 3) derived from a *Xenopus laevis* vitellogenin A2 gene, a promoter functional fragment (SEQ ID NO. 4) derived from a *Xenopus laevis* albumin gene, and a promoter functional fragment (SEQ ID NO. 5) derived from a human serpinAl gene.

Figure 1:
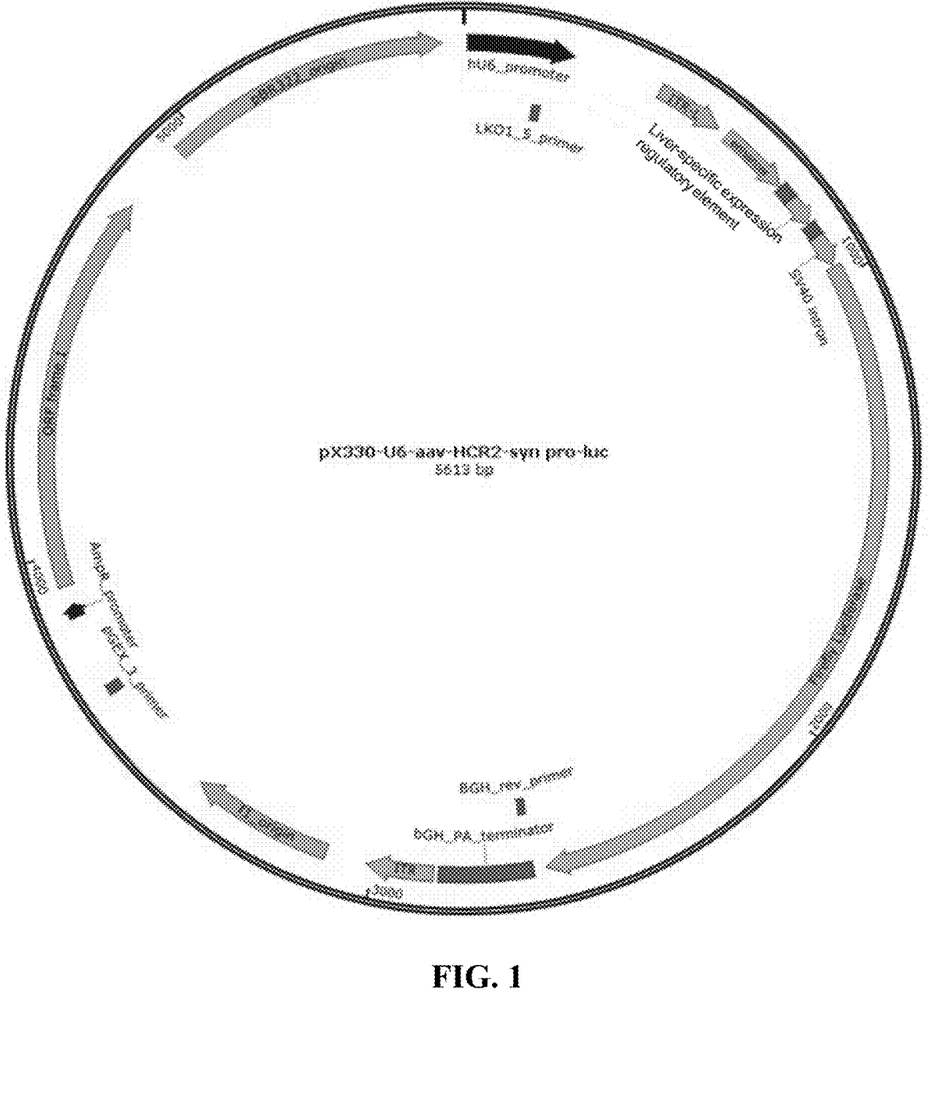
FIG. 1 shows the sequence map of an isolated nucleic acid molecule according to the present application.

The nucleic acid molecule constructed as shown in FIG. 1 is named GT001. GT001 comprises, in the 5'-to-3' direction, an enhancer (SEQ ID NO: 1), the liver-specific expression regulatory element, the SV40 intron (SEQ ID NO. 6), the Kozac sequence (SEQ ID NO. 7), the firefly luciferase gene (SEQ ID NO. 8), and a BGH-polyA signal sequence (SEQ ID NO.9), and AAV ITRs (5' ITR: SEQ ID NO. 12; 3' ITR: SEQ ID NO. 13) are located at the 5'-terminal of the promoter and the 3'-terminal of polyA.

The firefly luciferase gene of GT001 was replaced with the sfGFP gene (SEQ ID NO. 10), and the remaining elements were completely the same as those of GT001, whereby a nucleic acid molecule named GT002 is obtained.

The SV40 intron (SEQ ID NO. 6) of GT001 was replaced with the MVM intron (SEQ ID NO. 14), and the remaining elements remained unchanged, whereby a nucleic acid molecule named GT005 is obtained.

The BGH polyA (SEQ ID NO. 9) of GT001 was replaced with SV40 polyA (SEQ ID NO. 15), and the remaining elements remained unchanged, whereby a nucleic acid molecule named GT007 is obtained.

A control nucleic acid molecule GT003 of GT001 was additionally constructed, and the liver-specific expression regulatory element was replaced with the promoter (SEQ ID NO. 11) of the human serpinAl gene, i.e., the promoter (SEQ ID NO. 11) of the human serpinAl gene, the SV40 intron (SEQ ID NO. 6), the Kozac sequence (SEQ ID NO. 7), the firefly luciferase gene (SEQ ID NO. 8), and a BGH-A polyA signal sequence (SEQ ID NO. 9) in the 5'-to-3' direction in order, and AAV ITRs (5' ITR: SEQ ID NO. 12; 3' ITR: SEQ ID NO. 13) are located at the 5'-terminal of the promoter and the 3'-terminal of polyA.

The liver-specific expression regulatory element of GT002 was replaced with the promoter (SEQ ID NO. 11) of the human serpinAl gene to obtain the control nucleic acid GT004 of GT002.

The liver-specific expression regulatory element of GT005 was replaced with the promoter (SEQ ID NO. 11) of the human serpinAl gene to obtain the control nucleic acid GT006 of GT005.

The liver-specific expression regulatory element of GT007 was replaced with the promoter (SEQ ID NO. 11) of the human serpinAl gene to obtain the control nucleic acid GT008 of GT007.

Example 2 Detection of Expression Level of Nucleic Acid Molecule of the Present Application The expression level of the nucleic acid molecule described in the present application was detected with a dual-luciferase detection kit. The GT001 obtained in Example 1 and the control nucleic acid GT003 were respectively transfected with an internal reference nucleic acid molecule GTRluc (SEQ ID NO. 16) into human liver cells Huh7.5. After lysis, the cells were added to a 96-well plate, to which 100 μL of a prepared Fluc working solution was then added, and the plate was held at room temperature for 5 min and then read and detected. The 96-well plate was taken out, 100 μL of the prepared Rluc working solution was added to the plate, and the plate was held at room temperature for 5 minutes, and then continuously read and detected. The luminescence ratio of firefly luciferase to *Renilla* luciferase was calculated. With the same method, the luminescence ratio of firefly luciferase to *Renilla* luciferase (FLuc/RLuc) was calculated after the respective transfections of GT005 and the control nucleic acid GT006.

Figure 2:
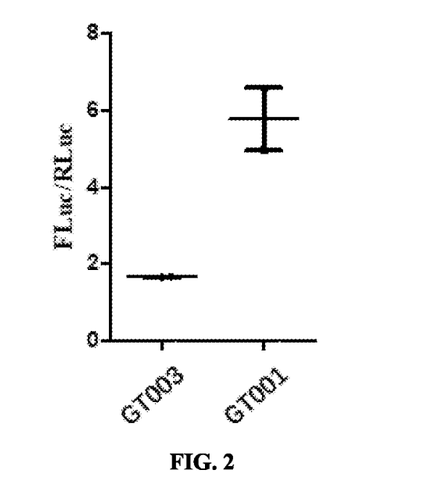
FIG. 2 shows the luminescence ratios of firefly luciferase to *Renilla* luciferase (FLuc/RLuc) in GT001 and GT003.
Figure 3:
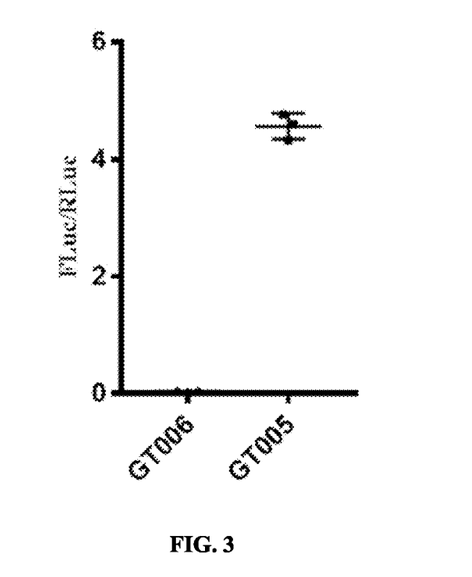
FIG. 3 shows the luminescence ratios of firefly luciferase to *Renilla* luciferase (FLuc/RLuc) in GT005 and GT006.

The results are shown in FIG. 2 and FIG. 3. Compared with the promoter of the human serpinAl gene, the liver-specific expression regulatory element of the present application can improve the expression of the gene of interest in the case of different promoters. Specifically, in the detection solution where the control nucleic acid of the promoter of the human serpinAl gene was used, the luminescence ratio of FLuc/RLuc is low, and even about zero; whereas the luminescence ratios of FLuc/RLuc in GT001 and GT005 is higher, and is at least more than 3 times higher than that of the control nucleic acid.

Figure 4:
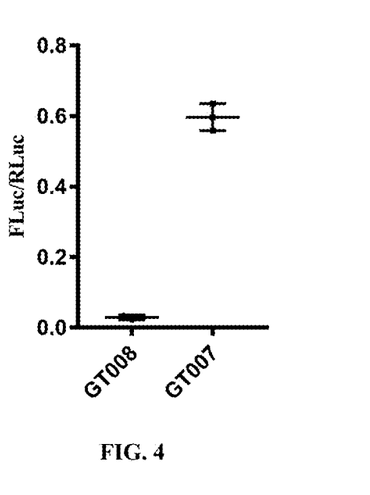
FIG. 4 shows the luminescence ratios of firefly luciferase to *Renilla* luciferase (FLuc/RLuc) in GT007 and GT008.

The GT007 and control nucleic acid GT008 obtained in Example 1 were respectively transfected with the internal reference nucleic acid molecule GTRluc into human liver cells Huh7.5. After lysis, protein quantification was carried out with BCA. An equal amount of protein was added for western blot, the expression levels of GT002 and GT004 were obtained by developing, and then grayscale quantification was carried out by software. The results are shown in FIG. 4. Compared with the promoter of the human serpinAl gene, the liver-specific expression regulatory element of the present application can also improve the expression of the gene of interest after the replacement with a different poly A.

Figure 5:
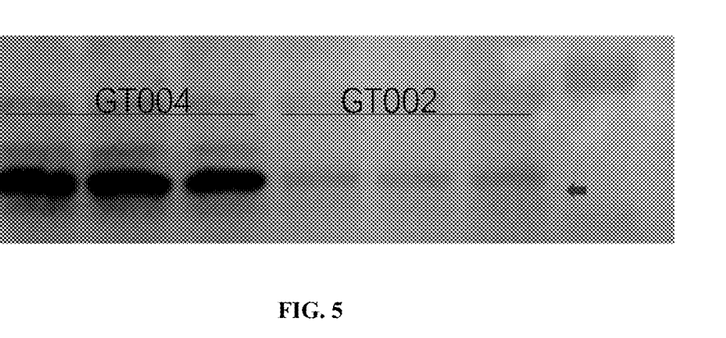
FIG. 5 shows the expression levels of proteins of interest in GT002 and GT004.

The GT002 and control nucleic acid GT004 obtained in Example 1 were transfected into human liver cells Huh7.5. After lysis, protein quantification was carried out with BCA. An equal amount of protein was added for western blot, and the expression levels of GT002 and GT004 were obtained by developing. The results are shown as in FIG. 5, where a red arrow indicates a protein of interest sfGFP. Compared with the promoter of the human serpinAl gene, the liver-specific expression regulatory element of the present application can also improve the expression of the gene of interest after a different gene of interest is used.

Example 3 Production of Recombinant AAV 3.1 Packaging of AAV Vector Plasmid

HEK293 cells were inoculated at a concentration of $4\times10^6/100$ ml in diameter onto a plate of a DMEM medium containing 10% FBS, and cultured overnight at 37° C. in a humid environment bearing 5% $CO_2$. In the next day, a PEI transfection mixture containing GT001 or GT003, an AAV capsid protein and a helper plasmid was prepared, then added to a medium, and cultured at 37° C. in a humid environment bearing 5% $CO_2$. 6 h after transfection, the medium was replaced with a fresh DMEM medium containing 10% FBS, and 72 h after transfection, cells were harvested. The transection mixture was resuspended in a buffer (pH=8) containing 100 mM sodium chloride, 2 mM magnesium chloride and 10 mM Tris, and stored at −80° C.

3.2 Purification and Quantitative Analysis of AAV Vector

HEK-293 cells containing rAAV underwent three freeze-thaw cycles, treated with 250 U/mL Benzonase for 30 min at 37° C. to remove unencapsulated DNA, and centrifuged at 4,000 g for 30 min at 4° C. The supernatant was retained. Iodixanol was prepared at a density gradient of 17%, 25%, 40%, and 60%, and a line was marked at a junction between 40% and 60%. A sample was added, the buffer was filled for balancing, and the resultant was centrifuged at 53,000 rpm for 2 h and 40 min at 14° C.

After the centrifugation, 40% of the solution was drawn out with a 5 mL syringe, underwent ultrafiltration replacement in a 100K ultrafiltration tube with PBS, and finally eluted with 1×PBS ($10^{-4}$ F188). A virus obtained by packaging GT001 was named GT001V, and a virus obtained by packaging GT003 was named GT003V. Then, the purified AVV vector genome was quantitatively analyzed by qPCR with a kit according to instructions, and the titer of a virus stock solution was determined.

Figure 6:
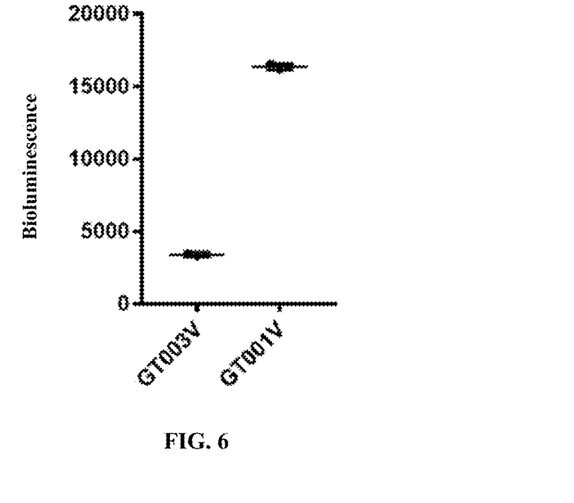
FIG. 6 shows the expression levels of proteins of interest in GT001V and GT003V.

Example 4 Detection of Expression Level of Nucleic Acid Molecule of the Present Application after Virus Packaging The huh7.5 cells were plated in a 96-well plate with $2\times10^4$ cells per well, and each well was filled with 100 ul of medium. After the cells were plated for 4 hours, the GT001V and the GT003V were added to the cells based on MOI=2000 and cultured for 48 h in a carbon dioxide incubator at 37° C. The supernatant was drawn and discarded; the plate was gently turned upside down on absorbent paper twice to remove the medium in the wells as much as possible; and a Luciferin working solution was added at 100ul/well for fluorescence detection. Results are as shown in FIG. 6. The liver-specific expression regulatory element of the present application can increase the expression of the gene of interest in cells after virus packaging, by at least more than 3 times.

The above results show that the liver-specific expression regulatory element of the present application can improve the expression of the gene of interest in the presence of different introns, different polyAs or different genes of interest.

The foregoing detailed description is provided by way of explanation and examples, and is not intended to limit the scope of the appended claims. Various changes of the embodiments listed in the present application until now would be obvious to those of ordinary skills in the art, and should be kept within the scope of the appended claims and equivalents thereof.

The invention claimed is:

1. An isolated nucleic acid molecule, comprising, in a 5'-to-3' direction, a liver-specific expression regulatory element and a gene of interest operably linked to the liver-specific expression regulatory element, wherein the liver-specific expression regulatory element comprises, in order in the 5'-to-3' direction: a promoter derived from the dog serpinA1 gene or functional fragment thereof, a promoter derived from the *xenopus laevis* vitellogenin A2 gene or functional fragment thereof, a promoter derived from the *xenopus laevis* albumin gene or the functional fragment thereof, and a promoter derived from the human serpinA1 gene or functional fragment thereof, wherein, the promoter derived from the dog serpinA1 gene or functional fragment thereof comprises the nucleotide sequence of SEQ ID NO: 2;

the promoter derived from the *xenopus laevis* vitellogenin A2 gene or functional fragment thereof comprises the nucleotide sequence of SEQ ID NO: 3;

the promoter derived from the *xenopus laevis* albumin gene or functional fragment thereof comprises the nucleotide sequence of SEQ ID NO: 4; and the promoter derived from the human serpinA1 gene or functional fragment thereof comprises the nucleotide sequence of SEQ ID NO: 5.

2. The isolated nucleic acid molecule according to claim 1, further comprising an intron located between the liver-specific expression regulatory element and the gene of interest.

3. The isolated nucleic acid molecule according to claim 2, wherein the intron is an SV40 intron or an MVM intron.

4. The isolated nucleic acid molecule according to claim 1, further comprising a polyadenylation signal sequence located at a 3'-terminal of the gene of interest.

5. The isolated nucleic acid molecule according to claim 4, wherein the polyadenylation signal sequence is a BGH-polyA signal sequence or an SV40 polyA signal sequence.

6. The isolated nucleic acid molecule according to claim 1, further comprising a Kozac sequence located between the liver-specific expression regulatory element and the gene of interest.

7. The isolated nucleic acid molecule according to claim 1, comprising, in order in the 5'-to-3' direction: the liver-specific expression regulatory element, an intron, a Kozac sequence, the gene of interest, and a polyadenylation signal sequence.

8. The isolated nucleic acid molecule according to claim 1, wherein the gene of interest encodes a protein of interest, and the protein of interest comprises a reporter protein, and/or a therapeutic protein.

9. The isolated nucleic acid molecule according to claim 8, wherein the protein of interest comprises sfGFP and firefly luciferase.

10. The isolated nucleic acid molecule according to claim 1, further comprising AAV inverted terminal repeats ITRs located at a 5'-terminal of the liver-specific expression regulatory element and at a 3'-terminal of the gene of interest.

11. The isolated nucleic acid molecule according to claim 10, wherein the AAV inverted terminal repeat ITR is derived from an AAV serotype which is AAV2.

12. The isolated nucleic acid molecule according to claim 10, wherein the AAV ITR comprises the nucleotide sequence SEQ ID NO: 12 or SEQ ID NO: 13.

13. A vector, comprising the isolated nucleic acid molecule of claim 1.

14. The vector according to claim 13, which is a viral vector or a polynucleotide vector.

15. The vector according to claim 13, which is a plasmid, a cosmid or a transposon.

16. The vector according to claim 13, which is a viral vector, wherein the viral vector comprises an AAV vector.

17. A method for expressing a gene of interest, comprising introducing the isolated nucleic acid molecule of claim 1 into a host cell, and allowing the gene of interest to be expressed in the host cell.

\* \* \* \* \*